(12) United States Patent
Kao et al.

(10) Patent No.: US 9,841,846 B2
(45) Date of Patent: Dec. 12, 2017

(54) EXPOSURE MECHANISM OF OPTICAL TOUCH SYSTEM AND OPTICAL TOUCH SYSTEM USING THE SAME

(71) Applicant: PixArt Imaging Inc., Hsin-chu County (TW)

(72) Inventors: Ming-Tsan Kao, Hsin-chu (TW); Tzung-Min Su, Hsin-chu (TW); Chih-Hsin Lin, Hsin-chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 16 days.

(21) Appl. No.: 14/991,062

(22) Filed: Jan. 8, 2016

(65) Prior Publication Data

US 2016/0124577 A1    May 5, 2016

Related U.S. Application Data

(62) Division of application No. 14/052,520, filed on Oct. 11, 2013, now Pat. No. 9,285,927.

(30) Foreign Application Priority Data

Oct. 24, 2012    (TW) .............................. 101139192 A

(51) Int. Cl.
G06F 3/041    (2006.01)
G06F 3/042    (2006.01)

(52) U.S. Cl.
CPC .......... *G06F 3/0421* (2013.01); *G06F 3/0416* (2013.01)

(58) Field of Classification Search
None
See application file for complete search history.

(56) References Cited

U.S. PATENT DOCUMENTS

2004/0201579 A1    10/2004  Graham
2004/0252091 A1    12/2004  Ma et al.
2010/0315383 A1    12/2010  Chang et al.

FOREIGN PATENT DOCUMENTS

| CN | 101770318 A | 7/2010 |
| CN | 101952793 A | 1/2011 |
| TW | 200917103 A | 4/2009 |
| TW | I327708 B | 7/2010 |

*Primary Examiner* — Joseph Haley
(74) *Attorney, Agent, or Firm* — Hauptman Ham, LLP

(57) ABSTRACT

An exposure mechanism of an optical touch system, which includes a plurality of image sensors and a plurality of active light sources each irradiating corresponding to the associated image sensor, includes: capturing image frames using the image sensors with a sampling cycle to allow each of the image sensors to capture a bright image, wherein the sampling cycle includes a plurality of working modes and in each of the working modes at least one of the image sensors captures the bright image in a sampling interval; simultaneously capturing a dark image using all the image sensors in a denoising sampling interval; and calculating a differential image between the bright image and the dark image captured by each image sensor.

15 Claims, 7 Drawing Sheets

```
capturing image frames with a sampling cycle to
allow each image sensor to capture a bright image        S41 simultaneously capturing a dark image using all
image sensors in a denoising sampling interval           S42 calculating a differential image between the bright
image and the dark image captured by each of the         S43
image sensors
```

EXPOSURE MECHANISM OF OPTICAL TOUCH SYSTEM AND OPTICAL TOUCH SYSTEM USING THE SAME

CROSS REFERENCE TO RELATED APPLICATION

This application is a divisional of U.S. application Ser. No. 14/052,520, filed Oct. 11, 2013, and claims the priority benefit of Taiwan Patent Application Serial Number 101139192, filed on Oct. 24, 2012, the full disclosure of which is incorporated herein by reference.

BACKGROUND

1. Field of the Disclosure

This disclosure generally relates to an optical touch system and, more particularly, to an exposure mechanism of an optical touch system and an optical touch system using the same that may shorten a total retrieval time of a bright image and a dark image spent by all image sensors.

2. Description of Related Art

An optical touch system generally utilizes a plurality of image sensors to sequentially capture a plurality of image frames containing a touch surface image and performs the object tracking according to the position of a finger image in the image frames.

For example referring to FIG. 1A, it shows a schematic diagram of the conventional optical touch system 9, which includes a touch surface 91, four image sensors 921-924 and four active light sources 931-934. When each of the image sensors 921-924 is capturing an image frame, the associated active light sources 931-934 irradiate so as to provide light for capturing the image frame.

Conventionally, it is able to calculate a differential image between a bright image and a dark image so as to eliminate the interference from ambient light.

For example referring to FIG. 1B, the image sensor 921 captures a bright image $I_{ON}$ corresponding to the irradiation of the active light source 931 and then captures a dark image $I_{OFF}$ corresponding to the extinction of the active light source 931. And the image sensors 922 to 924 operate similarly. A processing unit (not shown) is configured to calculate a differential image ($I_{ON}$-$I_{OFF}$) between the bright image $I_{ON}$ and the dark image $I_{OFF}$, and to perform the object positioning according to the differential image. It is assumed that a sampling interval of the image sensors 921 to 924 is T such that a total retrieval time for capturing a bright image $I_{ON}$ and a dark image $I_{OFF}$ by all the image sensors 921-924 equals 8T. In this manner, the synchronization between the image sensors 921-924 for capturing image frames is decreased. Especially when the number of the image sensors is increased, the total retrieval time for capturing a bright image and a dark image by all the image sensors becomes longer.

Accordingly, the present disclosure further provides an exposure mechanism of an optical touch system and an optical touch system using the same that may shorten the total retrieval time of a sampling cycle thereby improving the synchronization between image sensors for capturing image frames and increasing the positioning accuracy.

SUMMARY

The present disclosure provides an exposure mechanism of an optical touch system and an optical touch system using the same that have a shorter sampling cycle period and a higher system operating frequency.

The present disclosure further provides an exposure mechanism of an optical touch system and an optical touch system using the same that may eliminate the interference from ambient light.

The present disclosure provides an exposure mechanism of an optical touch system. The optical touch system includes a plurality of image sensors and a plurality of active light sources, and each of the active light sources irradiates corresponding to the associated image sensor. The exposure mechanism includes the steps of: capturing image frames using the image sensors with a sampling cycle to allow each of the image sensors to capture a bright image, wherein the sampling cycle includes a plurality of working modes and in each of the working modes at least one of the image sensors captures the bright image in a sampling interval; simultaneously capturing a dark image using all the image sensors in a denoising sampling interval; and calculating, using a processing unit, a differential image between the bright image and the dark image captured by each of the image sensors.

The present disclosure further provides an optical touch system including a touch surface, a plurality of reflection light bars, a first image sensor, a first active light source, a second image sensor, a second active light source and a processing unit. The reflection light bars are disposed on edges of the touch surface respectively. The first image sensor is configured to capture image frames looking across the touch surface in a first sampling interval and a denoising sampling interval to respectively obtain a first bright image and a first dark image. The first active light source is disposed adjacent to the first image sensor and configured to irradiate corresponding to the first sampling interval. The second image sensor is configured to capture image frames looking across the touch surface in a second sampling interval and the denoising sampling interval to respectively obtain a second bright image and a second dark image. The second active light source is disposed adjacent to the second image sensor and configured to irradiate corresponding to the second sampling interval. The processing unit is configured to calculate a first differential image between the first bright image and the first dark image and calculate a second differential image between the second bright image and the second dark image.

The present disclosure further provides an optical touch system including a touch surface, a plurality of irradiation light bars, a first image sensor, a second image sensor and a processing unit. The irradiation light bars are disposed at edges of the touch surface respectively. The first image sensor is configured to capture image frames looking across the touch surface in a first sampling interval and a denoising sampling interval to respectively obtain a first bright image and a first dark image, wherein the irradiation light bars within a field of view of the first image sensor irradiate corresponding to the first sampling interval. The second image sensor is configured to capture image frames looking across the touch surface in a second sampling interval and the denoising sampling interval to respectively obtain a second bright image and a second dark image, wherein the irradiation light bars within a field of view of the second image sensor irradiate corresponding to the second sampling interval. The processing unit is configured to calculate a first differential image between the first bright image and the first dark image and calculate a second differential image between the second bright image and the second dark image.

In one aspect, the sampling intervals of every working mode are identical, and the sampling intervals are identical to the denoising sampling interval.

In one aspect, the sampling intervals of every working mode are different, and the denoising sampling interval is equal to a shortest sampling interval of the sampling intervals.

In one aspect, the sampling intervals of a part of the working modes are different, and the denoising sampling interval is equal to a shortest sampling interval of the sampling intervals.

In one aspect, the processing unit may further adjust a pixel gray level of the associated dark image according to a time ratio of the sampling interval of the working mode and the denoising sampling interval, and calculate a differential image of the bright image and the adjusted dark image captured by each of the image sensors.

In one aspect, the image sensors simultaneously capture the dark image at first and then capture the bright image with the sampling cycle; or the image sensors capture the bright image with the sampling cycle at first and then simultaneously capture the dark image.

In the optical touch system and the exposure mechanism according to the embodiment of the present disclosure, as the dark image captured in the same denoising sampling interval is subtracted from the bright image captured in one sampling cycle so as to eliminate the interference from ambient light, a total retrieval time of all image sensors for capturing one bright image and one dark image is shortened. In addition, two successive sampling cycles may share the dark image captured in the same denoising sampling interval so as to further reduce the total retrieval time and increase the system operating frequency.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
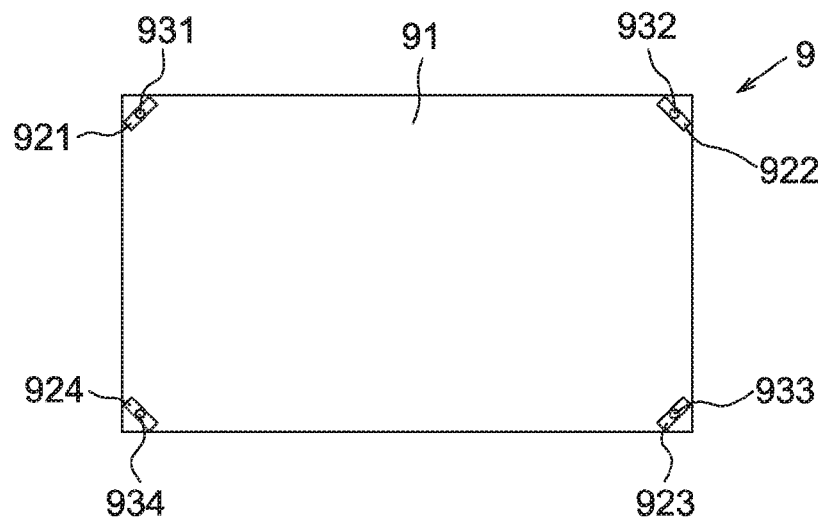
FIG. 1A shows a schematic diagram of a conventional optical touch system.
Figure 1B:
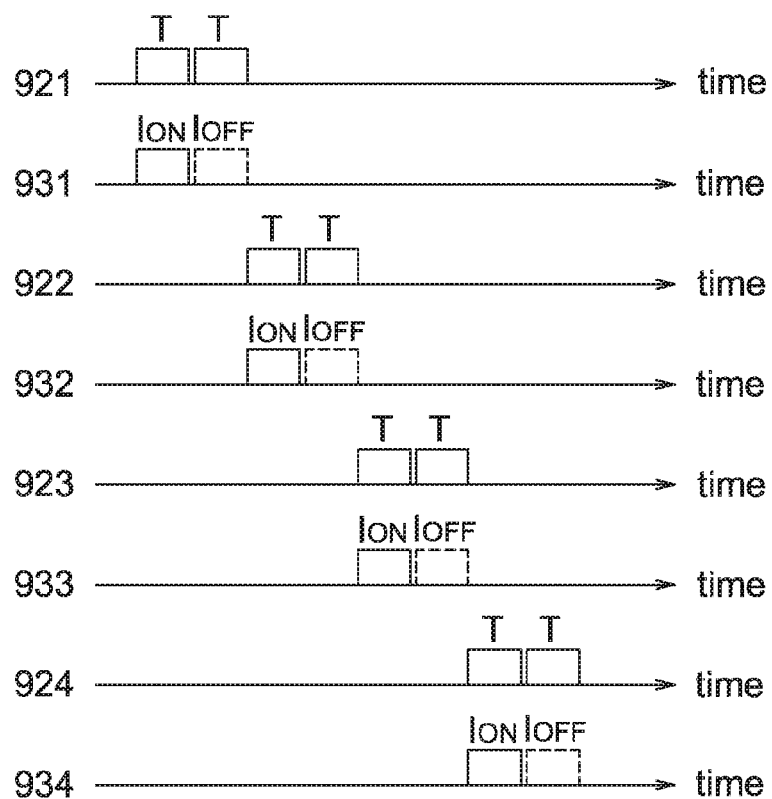
FIG. 1B shows an operational schematic diagram of the optical touch system of FIG. 1A.
Figures 2, 3:
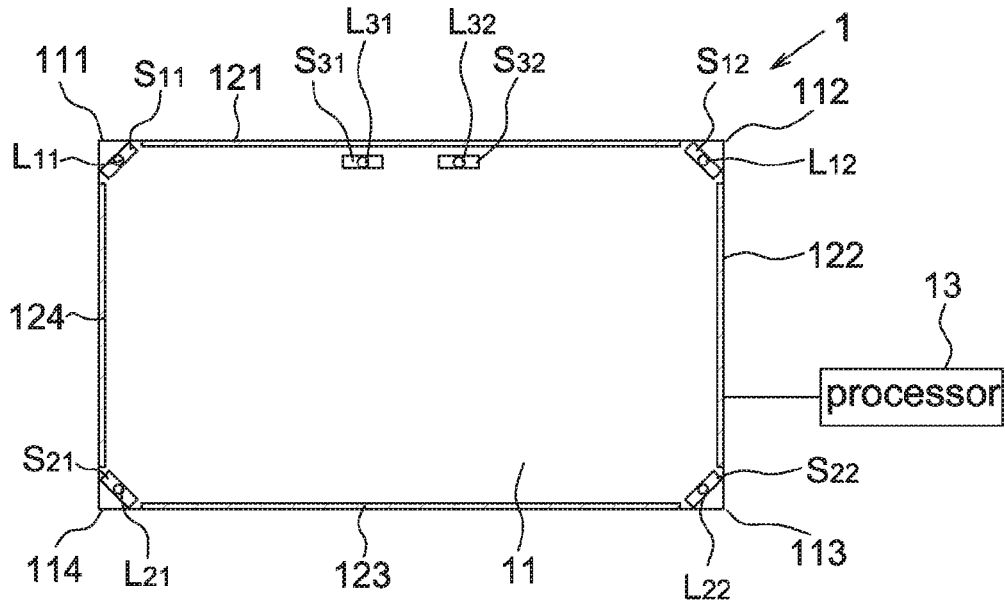
FIG. 2 shows a schematic diagram of the optical touch system according to an embodiment of the present disclosure.
FIG. 3 shows a flow chart of an exposure mechanism of the optical touch system according to the embodiment of the present disclosure.

Referring to FIG. 2, it shows a schematic diagram of the optical touch system according to an embodiment of the present disclosure. The optical touch system 1 according to the embodiment of the present disclosure includes a touch surface 11, a plurality of image sensors (e.g. $S_{11}$, $S_{12}$, $S_{21}$, $S_{22}$, $S_{31}$ and $S_{32}$), a plurality of light bars 121 to 124 and a processing unit 13. The image sensors may be CCD image sensors, CMOS image sensors or the like, and are configured to capture image frames looking across the touch surface 11, wherein the image sensors may be disposed at corners (e.g. 111 to 114) or edges of the touch surface 11. The processing unit 13 may be a digital signal processor (DSP) or other processors capable of processing image data, and is configured to post-process the image frames captured by the image sensors and to perform the object positioning, wherein the processing unit 13 may perform the object positioning according to conventional methods and the present disclosure is to shorten the total retrieval time for capturing a valid image by all the image sensors. Said valid image may include a bright image and a dark image herein.

The light bars 121 to 124 are respectively disposed at edges of the touch surface 11. The light bars 121 to 124 may be reflection light bars (i.e. the passive light source) or irradiation light bars (i.e. the active light source). In one embodiment, when the light bars 121 to 124 are reflection light bars, the optical touch system 1 may further include a plurality of active light sources (e.g. $L_{11}$, $L_{13}$, $L_{21}$, $L_{22}$, $L_{31}$ and $L_{32}$) disposed adjacent to the image sensors $S_{11}$ to $S_{32}$ respectively. For example, the active light sources $L_{11}$ to $L_{32}$ may be disposed next to or at the upper or lower rim of the image sensors $S_{11}$ to $S_{32}$ respectively as long as field of views of the image sensors are not blocked. In another embodiment, when the light bars 121 to 124 are irradiation light bars, the optical touch system 1 may not include the active light sources $L_{11}$ to $L_{32}$; or the optical touch system 1 may also include the active light sources $L_{11}$ to $L_{32}$ served as compensation light sources for light compensation so as to compensate the non-uniform brightness at the positions of the corners or the image sensors.

The active light sources (e.g. $L_{11}$ to $L_{32}$ or 121 to 124) are configured to provide light when the image sensors $S_{11}$ to $S_{32}$ are capturing images, and thus each of the active light sources irradiates corresponding to the associated image sensor.

Referring to FIG. 3, it shows a flow chart of the exposure mechanism of the optical touch system according to the embodiment of the present disclosure, which includes the steps of: capturing image frames with a sampling cycle to allow each image sensor to capture a bright image (Step $S_{41}$); simultaneously capturing a dark image using all image sensors in a denoising sampling interval (Step $S_{42}$); and calculating a differential image between the bright image and the dark image captured by each of the image sensors (Step $S_{43}$).

Figure 4A:
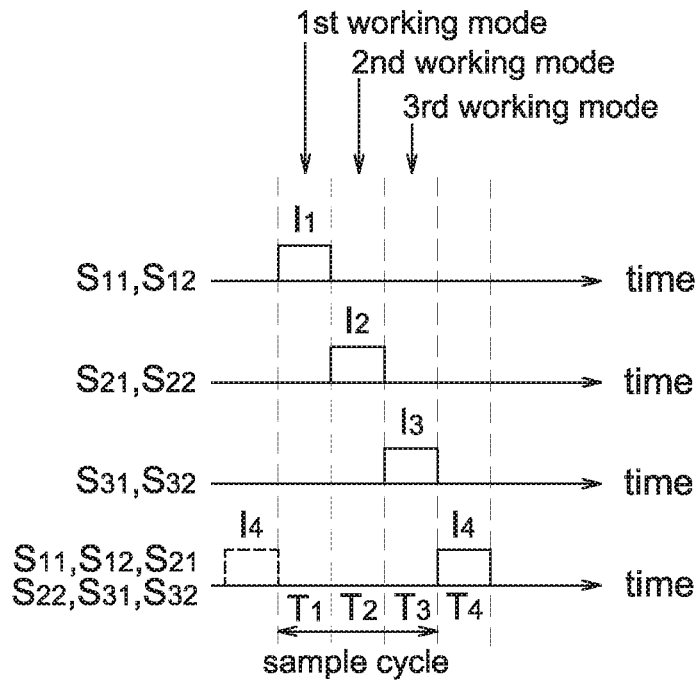
FIGS. 4A-4C show schematic diagrams of the exposure mechanism of the optical touch system of FIG. 2.
Figure 4B:
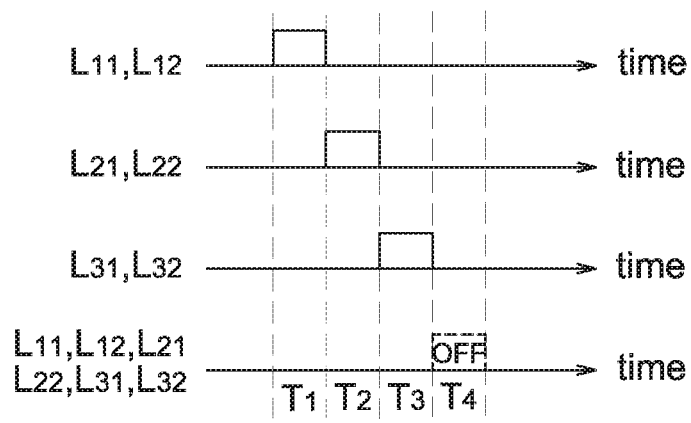
Figure 4C:
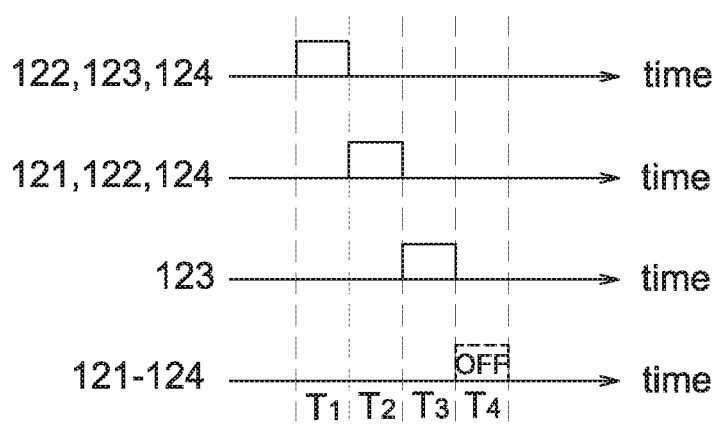

Referring to FIGS. 2, 3 and 4A-4C, FIGS. 4A-4C, show schematic diagrams of the exposure mechanism of the optical touch system 1 of FIG. 2, wherein FIG. 4B shows an operational schematic diagram when the light bars 121 to 124 are reflection light bars and FIG. 4C shows an operational schematic diagram when the light bars 121 to 124 are irradiation light bars.

Step $S_{41}$: The image sensors $S_{11}$ to $S_{32}$ respectively capture an image frame with a sampling cycle, wherein the sampling cycle may include a first working mode, a second working mode and a third working mode. In the first working mode, the image sensors $S_{11}$, $S_{12}$ respectively capture an image frame in a sampling interval $T_1$, and as the active light sources $L_{11}$, $L_{12}$ associated with the image sensors $S_{11}$, $S_{12}$ (FIG. 4B) or the active light sources 122, 123, 124 (FIG. 4C) irradiate corresponding to the sampling interval $T_1$, each of the image sensors $S_{11}$, $S_{12}$ may respectively capture a bright image $I_1$ (e.g. including a bright image $I_{1\_11}$ captured by the image sensor $S_{11}$ and a bright image $I_{1\_12}$ captured by the image sensor $S_{12}$). In the second working mode, the image sensors $S_{21}$, $S_{22}$ respectively capture an image frame in a sampling interval $T_2$, and as the active light sources $L_{21}$, $L_{22}$ associated with the image sensors $S_{21}$, $S_{22}$ (FIG. 4B) or the active light sources 121, 122, 124 (FIG. 4C) irradiate corresponding to the sampling interval $T_2$, each of the image sensors $S_{21}$, $S_{22}$ may respectively capture a bright image $I_2$ (e.g. including a bright image $I_{2\_21}$ captured by the image sensor $S_{21}$ and a bright image $I_{2\_22}$ captured by the image sensor $S_{22}$). In the third working mode, the image sensors $S_{31}$, $S_{32}$ respectively capture an image frame in a sampling interval $T_3$, and as the active light sources $L_{31}$, $L_{32}$ associated with the image sensors $S_{31}$, $S_{32}$ (FIG. 4B) or the active light source 123 (FIG. 4C) irradiates corresponding to the sampling interval $T_3$, each of the image sensors $S_{31}$, $S_{32}$ may respectively capture a bright image $I_3$ (e.g. including a bright image $I_{3\_31}$ captured by the image sensor $S_{31}$ and a bright image $I_{3\_32}$ captured by the image sensor $S_{32}$). Therefore, when the sampling cycle finishes, each of the image sensors has captured a bright image. It should be mentioned that when the light bars 121 to 124 are irradiation light bars, the active light source associated with an image sensor is referred to the active light sources 121 to 124 within a field of view of the image sensor. When the light bars 121 to 124 are reflection light bars, the active light source associated with an image sensor is referred to the active light sources $L_{11}$ to $L_{32}$ (e.g. the active light source adjacent to the image sensor) that irradiate to allow the reflection light bars within a field of view of the image sensor to generate reflected light. It is appreciated that the active light sources associated with the image sensors $S_{11}$ to $S_{32}$ shown in FIG. 4C are only exemplary.

Step $S_{42}$: Next, all the image sensors $S_{11}$ to $S_{32}$ respectively capture a dark image $I_4$ simultaneously in a denoising sampling interval $T_4$ (e.g. including a dark image $I_{4\_11}$ captured by the image sensor $S_{11}$, a dark image $I_{4\_12}$ captured by the image sensor $S_{12}$, a dark image $I_{4\_21}$ captured by the image sensor $S_{21}$, a dark image $I_{4\_22}$ captured by the image sensor $S_{22}$, a dark image $I_{4\_31}$ captured by the image sensor $S_{31}$ and a dark image $I_{4\_32}$ captured by the image sensor $S_{32}$); that is, in the denoising sampling interval $T_4$, all the active light sources $L_{11}$ to $L_{32}$ or 121 to 124 are turned off (extinction). In other words, the image sensors $S_{11}$ to $S_{32}$ capture an image frame under the condition that all active light sources are turned off, and thus the image frame captured now is referred to the dark image herein.

Step $S_{43}$: Finally, the processing unit 13 calculates a differential image (e.g. including $I_{1\_11}$-$I_{4\_11}$, $I_{1\_12}$-$I_{4\_12}$, $I_{2\_21}$-$I_{4\_21}$, $I_{2\_22}$-$I_{4\_22}$, $I_{3\_31}$-$I_{4\_31}$, $I_{3\_32}$-$I_{4\_32}$) between the bright images $I_1$ to $I_3$ and the dark image $I_4$ captured by each of the image sensors so as to eliminate the interference from ambient light. The processing unit 13 then performs the object positioning according to the differential images.

In one embodiment, sampling intervals of every working mode are identical and the sampling intervals $T_1$ to $T_3$ may identical to the denoising sampling interval $T_4$; that is, $T_1=T_2=T_3=T_4$.

In one embodiment, sampling intervals of different working modes may or may not be identical; that is, the sampling intervals $T_1$ to $T_4$ may be identical or different. For example, as distances of the image sensors $S_{11}$ and $S_{12}$ from the opposite active light bars are farther than distances of the image sensors $S_{31}$ and $S_{32}$ from the opposite active light bars, the sampling interval $T_1$ may be longer than the sampling interval $T_3$ to allow the bright images $I_1$ and $I_3$ to have substantially identical brightness, but not limited to. The value of the sampling intervals may be adjusted according to actual applications. For example, when the touch surface 11 is set perpendicular to the horizontal plane, field of views of the image sensors $S_{21}$ and $S_{22}$ may cover more ambient light thereby having brightness higher than that of field of views of the image sensors $S_{11}$, $S_{12}$, $S_{31}$ and $S_{32}$. Accordingly, the sampling interval $T_2$ may be shorter than the sampling intervals $T_1$ and $T_3$ to allow the bright images $I_1$ to $I_3$ to have substantially identical brightness, but not limited to. As mentioned above values of the sampling intervals may be set according to actual applications.

In one embodiment, if the sampling intervals of every working mode are different, the denoising sampling interval may be equal to a shortest sampling interval of the sampling intervals. For example, if the second sampling interval $T_2$ is the shortest sampling interval, the denoising sampling interval $T_4$ is equal to the second sampling interval Meanwhile, as the first sampling interval $T_1$ of the first working mode and the third sampling interval $T_3$ of the third working mode are not equal to the denoising sampling interval $T_4$, the processing unit 13 may adjust a pixel gray level of the associated dark image according to a time ratio of the sampling interval of different working modes and the denoising sampling interval before calculating the differential image; for example, calculating a time ratio $(T_1/T_4)$ and adjusting pixel gray levels of the dark images $I_{4\_11}$, $I_{4\_12}$ to $I_{4\_11}'$, $I_{4\_12}'$ according to the time ratio $(T_1/T_4)$; calculating a time ratio $(T_3/T_4)$ and adjusting pixel gray levels of the dark images $I_{4\_31}$, $I_{4\_32}$ to $I_{4\_31}'$, $I_{4\_32}'$ according to the time ratio $(T_3/T_4)$ such that the exposure condition of all dark images are substantially identical. Then, the processing unit 13 calculates a differential image between the bright image and the adjusted dark image captured by each of the image sensors, e.g. calculating $I_{1\_11}$-$I_{4\_11}'$, $I_{1\_12}$-$I_{4\_12}'$, $I_{2\_21}$-$I_{4\_21}$, $I_{2\_22}$-$I_{4\_22}$, $I_{3\_31}$-$I_{4\_31}'$, $I_{3\_32}$-$I_{4\_32}'$) and then performs the object positioning according to the differential images.

In another embodiment, sampling intervals of a part of the working modes may be identical but different from sampling intervals of other working modes.

For example in FIG. 4A, it is possible that the sampling intervals are arranged as $T_1=T_3\neq T_2$, but not limited to. As mentioned above, the processing unit 13 may also calculate a time ratio of each sampling interval and the denoising sampling interval to accordingly adjust the pixel gray level of the dark image according to the time ratio.

In addition, the image sensors may simultaneously capture the dark images at first (e.g. the dark image $I_4$ shown by the dashed line in FIG. 4A) and then capture the bright images with the sampling cycle; or may capture the bright images with the sampling cycle at first and then simultaneously capture the dark images (e.g. the dark image $I_4$ shown by the solid line in FIG. 4A). The present disclosure is to capture the bright images sequentially using the image sensors in the sampling cycle and to capture the dark images simultaneously in a denoising sampling interval (e.g. $T_4$).

In addition, when the optical touch system 1 operates continuously, two sampling cycles may share the dark image captured in one denoising sampling interval. For example referring to FIG. 5, the image sensors $S_{11}$ to $S_{32}$ respectively capture a first bright image $I_1$ to $I_3$ with a first sampling cycle $T_1$ to $T_3$, and then simultaneously capture the dark image $I_4$ in the denoising sampling interval $T_4$, and then respectively capture a second bright image $I_1'$ to $I_3'$ with a second sampling cycle $T_1'$ to $T_3'$. The processing unit 13 then calculates a first differential image (e.g. including $I_{1\_11}$-$I_{4\_11}$, $I_{1\_12}$-$I_{4\_12}$, $I_{2\_21}$-$I_{4\_21}$, $I_{2\_22}$-$I_{4\_22}$, $I_{3\_31}$-$I_{4\_31}$, $I_{3\_32}$-$I_{4\_32}$) between the first bright images $I_1$ to $I_3$ and the dark image $I_4$ and calculates a second differential image (e.g. including $I_{1\_11}'$-$I_{4\_11}$, $I_{1\_12}'$-$I_{4\_12}$, $I_{2\_21}'$-$I_{4\_21}$, $I_{2\_22}'$-$I_{4\_22}$, $I_{3\_31}'$-$I_{4\_31}$, $I_{3\_32}'$-$I_{4\_32}$) between the second bright images $I_1'$ to $I_3'$ and the dark image $I_4$. In this manner, as the image sensors $S_{11}$ to $S_{32}$ do not capture the dark image between the second sampling cycle and a next first sampling cycle, the total retrieval time for capturing bright and dark images within two successive sampling cycles may further be decreased. As the frequency of capturing the bright images is increased, the system operating frequency is increased correspondingly. In addition, it should be mentioned that, for simplification, FIG. 5 only shows the operation of the image sensors $S_{11}$ to $S_{32}$, and the operation of the active light sources $L_{11}$ to $L_{32}$ or 121 to 124 are similar to FIGS. 4B-4C.

It should be mentioned that the optical touch system according to the embodiment of the present disclosure is not limited to including six image sensors $S_{11}$-$S_{32}$ and active light sources $L_{11}$ to $L_{32}$ shown in FIG. 2, the numbers thereof may be determined according to the algorithm adopted by the processing unit 13 for performing the object positioning. For example, the optical touch system 1 according to an embodiment of the present disclosure is described below with two image sensors (e.g. $S_{11}$ and $S_{12}$) each corresponding to a working mode respectively. The optical touch system 1 includes the touch surface 11 and a plurality of light bars 121 to 123 disposed at edges of the touch surface 11 respectively.

Figure 6A:
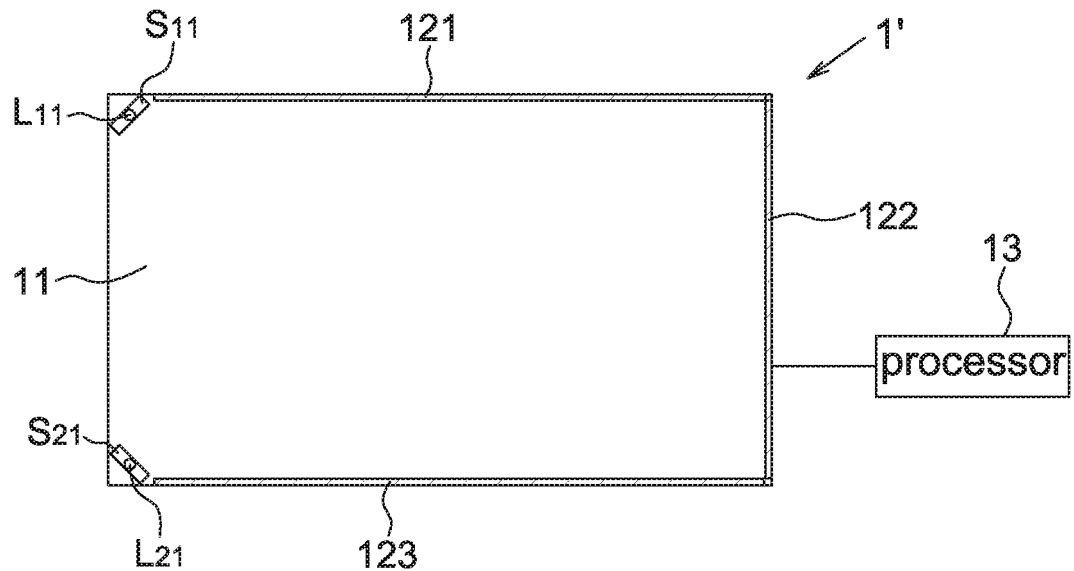
FIGS. 6A-6B show schematic diagrams of the optical touch system according to another embodiment of the present disclosure.

Referring to FIGS. 4A, 4B and 6A, when the light bars 121 to 123 are reflection light bars, the optical touch system 1' may further include two active light sources (e.g. $L_{11}$ and $L_{12}$) disposed adjacent to the image sensors $S_{11}$ and $S_{12}$ respectively. In this embodiment, a first image sensor $S_{11}$ captures image frames looking across the touch surface 11 in a first sampling interval $T_1$ and a denoising sampling interval $T_4$ to obtain a first bright image $I_{1\_11}$ and a first dark image $I_{4\_11}$ respectively (FIG. 4A); and a first active light source $L_{11}$ irradiates corresponding to the first sampling interval $T_1$ (FIG. 4B). A second image sensor $S_{21}$ captures image frames looking across the touch surface 11 in a second sampling interval $T_2$ and the denoising sampling interval $T_4$ to obtain a second bright image $I_{2\_21}$ and a second dark image $I_{4\_21}$ respectively (FIG. 4A); and a second active light source $L_{21}$ irradiates corresponding to the second sampling interval $T_2$ (FIG. 4B). A processing unit 13 calculates a first differential image ($I_{1\_11}$-$I_{4\_11}$) between the first bright image $I_{1\_11}$ and the first dark image $I_{4\_11}$, and calculates a second differential image ($I_{2\_21}$-$I_{4\_21}$) between the second bright image $I_{2\_21}$ and the second dark image $I_{4\_21}$.

In this embodiment, the denoising sampling interval $T_4$ may also be early than (e.g. $I_4$ shown by the dashed line in FIG. 4A) or later than (e.g. $I_4$ shown by the solid line in FIG. 4A) the first sampling interval $T_1$ and second sampling interval $T_2$.

In one embodiment, it is assumed that the first sampling interval $T_1$ is longer than the second sampling interval $T_2$, and the denoising sampling interval $T_4$ is equal to the second sampling interval $T_2$; that is, the denoising sampling interval $T_4$ is equal to the smaller one of the first sampling interval $T_1$ and the second sampling interval $T_2$. In this case, the processing unit 13 may further calculate a time ratio ($T_1/T_4$) of the first sampling interval $T_1$ and the denoising sampling interval $T_4$, and adjust the pixel gray level of the first dark image $I_{4\_11}$ according to the time ratio ($T_1/T_4$).

In another embodiment, the first sampling interval $T_1$, the second sampling interval $T_2$ and the denoising sampling interval $T_4$ may all be identical.

Figure 5:
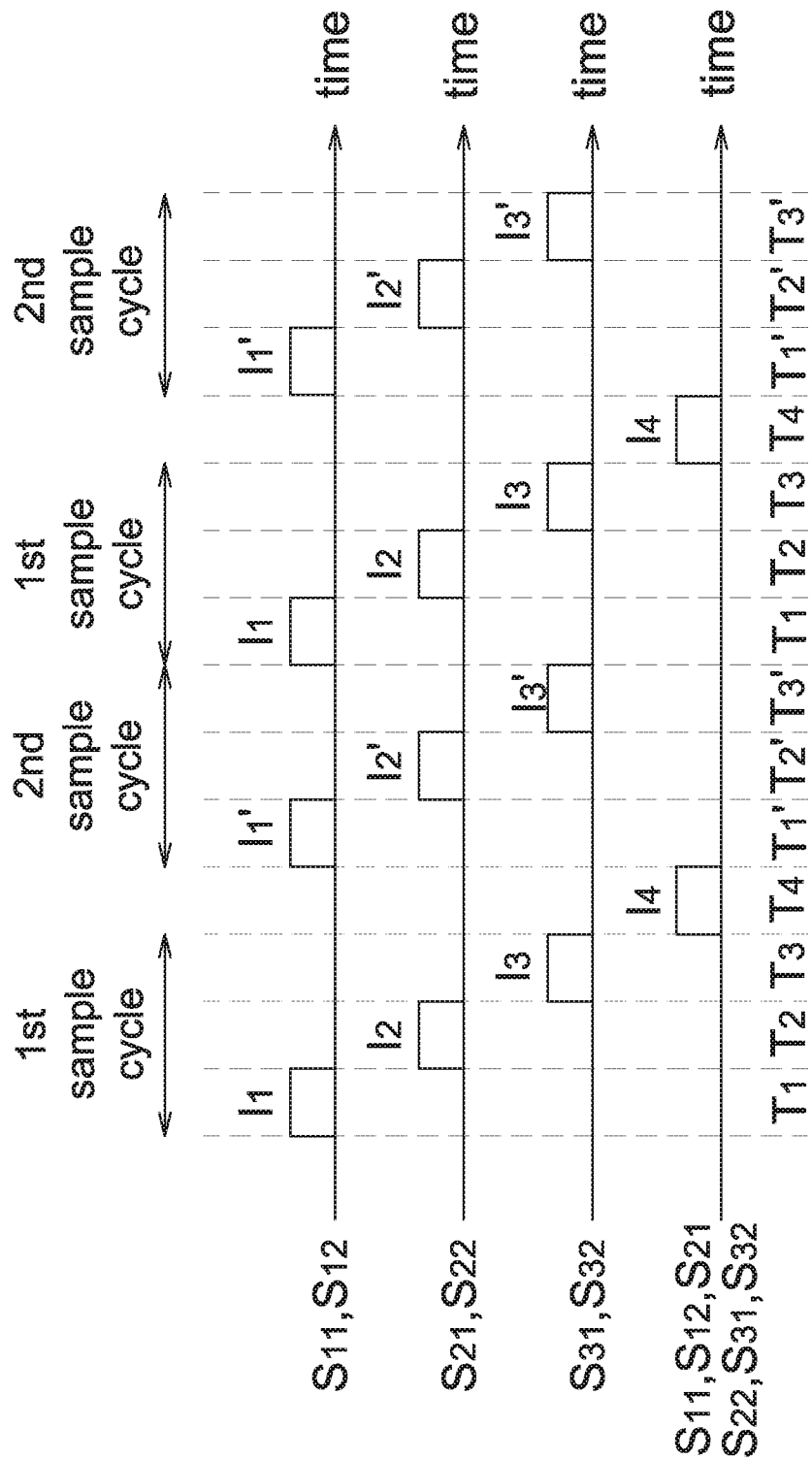
FIG. 5 shows another schematic diagram of the exposure mechanism of the optical touch system of FIG. 2.

Referring to FIG. 5, when the optical touch system 1' operates continuously, it is assumed that the first sampling interval $T_1$ and the second sampling interval $T_2$ form a first sampling cycle, and the denoising sampling interval $T_4$ is later than the first sampling cycle. The first image sensor $S_{11}$ captures a bright image $I_{1\_11}'$ in a first sampling interval $T_1'$ of a second sampling cycle after the denoising sampling interval $T_4$, and the first active light source $L_{11}$ irradiates corresponding to the first sampling interval $T_1'$ of the second sampling cycle (as FIG. 4B). The second image sensor $S_{21}$ captures a bright image $I_{2\_21}'$ in a second sampling interval $T_2'$ of the second sampling cycle after the denoising sampling interval $T_4$, and the second active light source $L_{21}$ irradiates corresponding to the second sampling interval $T_2'$ of the second sampling cycle (as FIG. 4B). The processing unit 13 further calculates a differential image ($I_{1\_11}'$-$I_{4\_11}$) between the bright image $I_{1\_11}'$ of the first sampling interval $T_1'$ of the second sampling cycle and the first dark image $I_{4\_11}$, and calculates a differential image ($I_{2\_21}'$-$I_{4\_21}$) between the bright image $I_{2\_21}'$ of the second sampling interval $T_2'$ of the second sampling cycle and the second dark image $I_{4\_21}$.

Figure 6B:
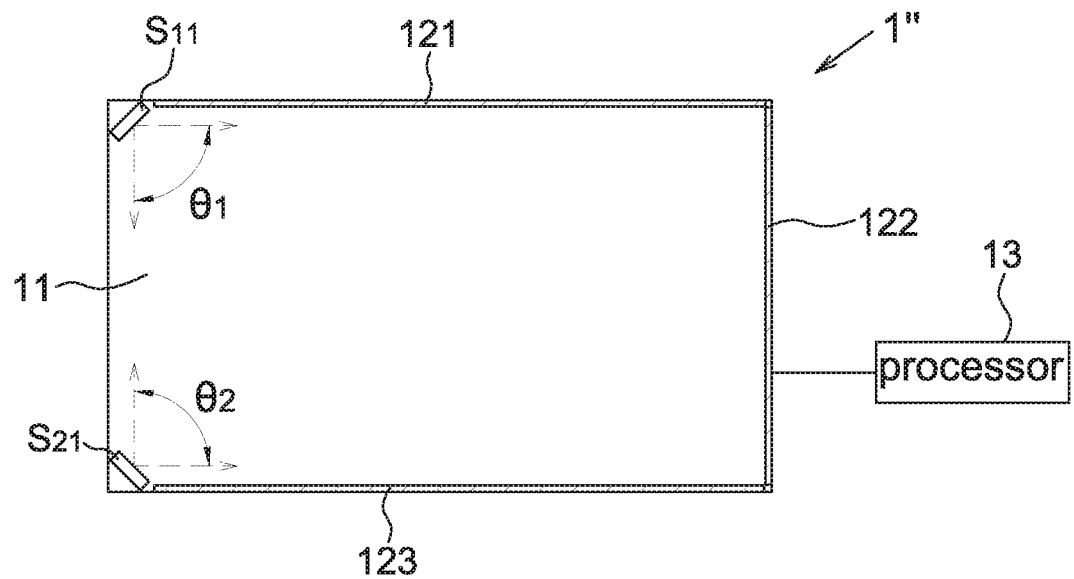

Referring to FIGS. 4A, 4C and 6B, when the light bars 121 to 123 are irradiation light bars, the optical touch system 1" may not further include two active light sources disposed adjacent to the image sensors $S_{11}$ and $S_{12}$ respectively. In this embodiment, a first image sensor $S_{11}$ captures image frames looking across the touch surface 11 in a first sampling interval $T_1$ and a denoising sampling interval $T_4$ to obtain a first bright image $I_{1\_11}$ and a first dark image $I_{4\_11}$ respectively (FIG. 4A); and the light bar(s) (e.g. 122, 123 herein) within a field of view $\theta_1$ of the first image sensor $S_{11}$ irradiate corresponding to the first sampling interval $T_1$ (FIG. 4C). A second image sensor $S_{21}$ captures image frames looking across the touch surface 11 in a second sampling interval $T_2$ and the denoising sampling interval $T_4$ to obtain a second bright image $I_{2\_21}$ and a second dark image $I_{4\_21}$ respectively (FIG. 4A); and the light bar(s) (e.g. 121, 122 herein) within a field of view $\theta_2$ of the second image sensor $S_{21}$ irradiate corresponding to the second sampling interval $T_2$ (FIG. 4C). A processing unit 13 calculates a first differential image ($I_{1\_11}$-$T_{4\_11}$) between the first bright image $I_{1\_11}$ and the first dark image $I_{4\_11}$, and calculates a second differential image ($I_{2\_21}$-$I_{4\_21}$) between the second bright image $I_{2\_21}$ and the second dark image $I_{4\_21}$.

Similarly, in this embodiment the denoising sampling interval $T_4$ may also be early than (e.g. $I_4$ shown by the dashed line in FIG. 4A) or later than (e.g. $I_4$ shown by the solid line in FIG. 4A) the first sampling interval $T_1$ and second sampling interval $T_2$.

Similarly, it may be assumed that the first sampling interval $T_1$ is longer than the second sampling interval $T_2$, and the denoising sampling interval $T_4$ is equal to the second sampling interval $T_2$. The processing unit 13 may further calculate a time ratio ($T_1/T_4$) of the first sampling interval $T_1$ and the denoising sampling interval $T_4$, and adjust the pixel gray level of the first dark image $I_{4\_11}$ according to the time ratio ($T_1/T_4$).

Similarly, the first sampling interval $T_1$, the second sampling interval $T_2$ and the denoising sampling interval $T_4$ may all be identical.

Referring to FIG. 5, when the optical touch system 1" operates continuously, it is assumed that the first sampling interval $T_1$ and the second sampling interval $T_2$ form a first sampling cycle, and the denoising sampling interval $T_4$ is later than the first sampling cycle. The first image sensor $S_{11}$ captures a bright image $I_{1\_11}'$ in a first sampling interval $T_1'$ of a second sampling cycle after the denoising sampling interval $T_4$, and the light bars 122, 123 within the field of view $\theta_1$ of the first image sensor $S_{11}$ irradiate corresponding to the first sampling interval $T_1'$ of the second sampling cycle (as FIG. 4C). The second image sensor $S_{21}$ captures a bright image $I_{2\_21}'$ in a second sampling interval $T_2'$ of the second sampling cycle after the denoising sampling interval $T_4$, and the light bars 121, 122 within the field of view $\theta_2$ of the second image sensor $S_{21}$ irradiate corresponding to the second sampling interval $T_2'$ of the second sampling cycle (as FIG. 4C). The processing unit 13 further calculates a differential image $(I_{1\_11}'-I_{4\_11})$ between the bright image $I_{1\_11}'$ of the first sampling interval of the second sampling cycle and the first dark image $I_{4\_11}$, and calculates a differential image $(I_{2\_21}'-I_{4\_21})$ between the bright image $I_{2\_21}'$ of the second sampling interval $T_2'$ of the second sampling cycle and the second dark image $I_{4\_21}$.

In another embodiment, the optical touch system 1 may include three image sensors (e.g. $S_{11}$, $S_{21}$ and $S_{31}$) corresponding to one working mode of a sampling cycle respectively, and details thereof are similar to FIGS. 2 and 4A-4C by only considering the image sensors $S_{11}$, $S_{21}$ and $S_{31}$, and the active light sources $L_{11}$, $L_{21}$ and $L_{31}$ or 121 to 123. For example when the light bars are reflection light bars, a third image sensor $S_{31}$ captures image frames looking across the touch surface 11 in a third sampling interval $T_3$ and the denoising sampling interval $T_4$ to obtain a third bright image $I_{3\_31}$ and a third dark image $I_{4\_31}$ respectively; and a third active light source $L_{31}$ is disposed adjacent to the third image sensor $S_{31}$ to irradiate corresponding to the third sampling interval $T_3$. For example when the light bars are irradiation light bars, the third image sensor $S_{31}$ captures image frames looking across the touch surface 11 in the third sampling interval $T_3$ and the denoising sampling interval $T_4$ to obtain a third bright image $I_{3\_31}$ and a third dark image $I_{4\_31}$ respectively; and the light bar 123 within a field of view of the third image sensor $S_{31}$ irradiates corresponding to the third sampling interval $T_3$.

In addition, it should be mentioned that in one sampling cycle of the optical touch system according to the embodiment of the present disclosure, it is not limited to capturing image frames simultaneously using two image sensors in every working mode as shown in FIG. 4A. In other embodiments, it may use at least one image sensor to capture the bright image in every working mode.

Figure 7A:
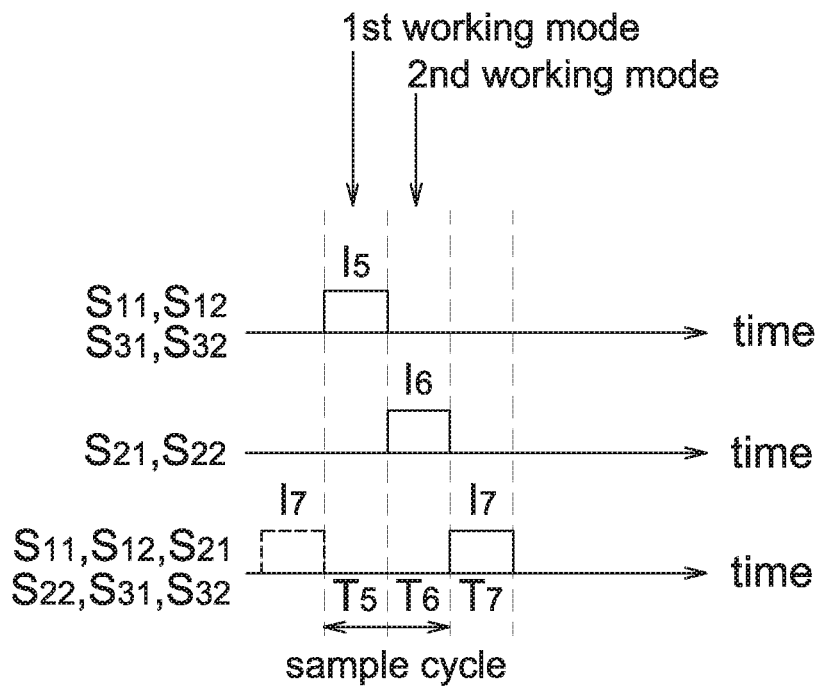
FIGS. 7A-7C show schematic diagrams of another exposure mechanism of the optical touch system of FIG. 2.
Figure 7B:
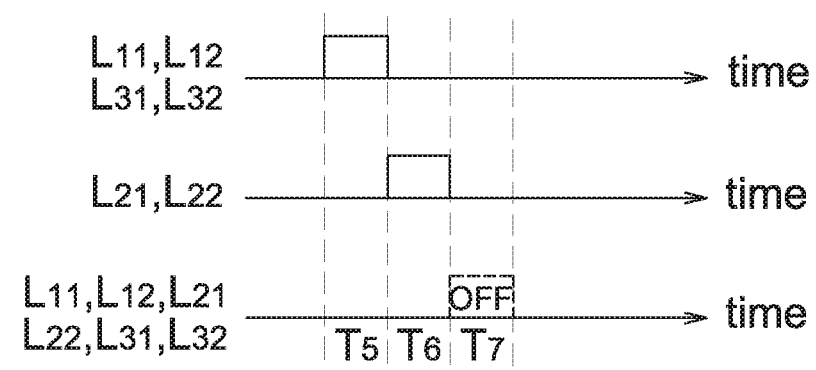
Figure 7C:
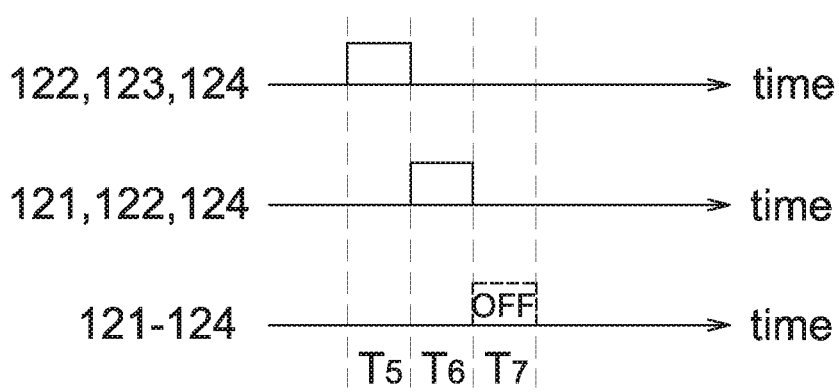

For example referring to FIGS. 7A-7C, they show schematic diagrams of another exposure mechanism of the optical touch system 1 of FIG. 2. In this embodiment, one sampling cycle includes two working modes. In a first working mode, the image sensors $S_{11}$, $S_{12}$, $S_{31}$ and $S_{32}$ capture an image frame in a sampling interval $T_5$ respectively and as the active light sources $L_{11}$, $L_{12}$, $L_{31}$ and $L_{32}$ associated with the image sensors $S_{11}$, $S_{12}$, $S_{31}$ and $S_{32}$ (FIG. 7B) or the active light sources 122, 123 and 124 (FIG. C) irradiate corresponding to the sampling interval $T_5$, the image sensors $S_{11}$, $S_{12}$, $S_{31}$ and $S_{32}$ may capture a bright image $I_5$ respectively. In a second working mode, the image sensors $S_{21}$ and $S_{22}$ capture an image frame in a sampling interval $T_6$ respectively and as the active light sources $L_{21}$ and $L_{22}$ associated with the image sensors $S_{21}$ and $S_{22}$ (FIG. 7B) or the active light sources 121, 122 and 124 (FIG. C) irradiate corresponding to the sampling interval $T_6$, the image sensors $S_{21}$ and $S_{22}$ may capture a bright image $I_6$ respectively. Accordingly, when the sampling cycle finishes, each of the image sensors has captured a bright image similar to the step $S_{41}$ of FIG. 3.

Next, all image sensors $S_{11}$ to $S_{32}$ simultaneously capture a dark image respectively in a denoising sampling interval $T_7$ similar to the step $S_{42}$ of FIG. 3.

Finally, the processing unit 13 calculates a differential image (e.g. including $I_{5\_11}-I_{7\_11}$, $I_{5\_12}-I_{7\_12}$, $I_{6\_21}-I_{7\_21}$, $I_{6\_22}-I_{7\_22}$, $I_{5\_31}-I_{7\_31}$, $I_{5\_32}-I_{7\_32}$) between the bright images $I_5$ to $I_6$ (e.g. including $I_{5\_11}$, $I_{5\_12}$, $I_{6\_21}$, $I_{6\_22}$, $I_{5\_31}$, $I_{5\_32}$) and the dark image $I_7$ (e.g. including $I_{7\_11}$, $I_{7\_12}$, $I_{7\_21}$, $I_{7\_22}$, $I_{7\_31}$, $I_{7\_32}$) captured by each of the image sensors so as to eliminate the interference from ambient light. The processing unit 13 then performs the object positioning according to the differential images similar to the step $S_{43}$ of FIG. 3.

Figure 8:
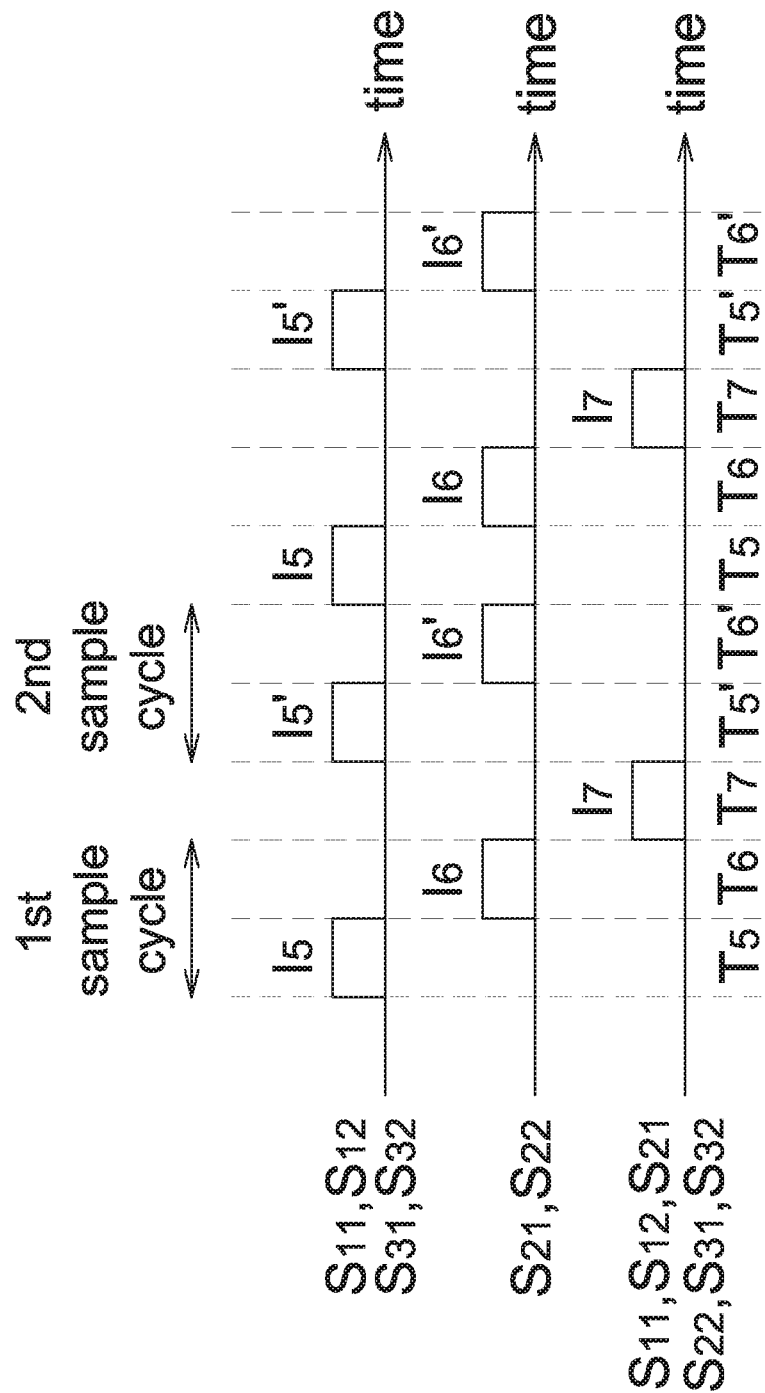
FIG. 8 shows another schematic diagram of the exposure mechanism of the optical touch system of FIG. 2.

Similarly, when the optical touch system 1 operates continuously, two sampling cycles may share the dark image captured in one denoising sampling interval. For example referring to FIG. 8, the image sensors $S_{11}$ to $S_{32}$ respectively capture a first bright image $I_5$ to $I_6$ with a first sampling cycle $T_5$ to $T_6$, and then simultaneously capture the dark image $I_7$ in the denoising sampling interval $T_7$, and then respectively capture a second bright image $I_5'$ to $I_6'$ with a second sampling cycle $T_5'$ to $T_6'$. The processing unit 13 then calculates a first differential image (e.g. including $I_{5\_11}-I_{7\_11}$, $I_{5\_12}I_{7\_12}$, $I_{6\_21}-I_{7\_21}$, $I_{6\_22}-I_{7\_22}$, $I_{5\_31}-I_{7\_31}$, $I_{5\_32}-I_{7\_32}$) between the first bright images $I_5$ to $I_6$ and the dark image $I_7$ and calculates a second differential image (e.g. including $I_{5\_11}'-I_{7\_11}$, $I_{5\_12}'-I_{7\_12}$, $I_{6\_21}'-I_{7\_21}$, $I_{6\_22}'-I_{7\_22}$, $I_{5\_31}'-I_{7\_31}$, $I_{5\_32}'-I_{7\_32}$) between the second bright images $I_5'$ to $I_6'$ and the dark image $I_7$. In this manner, the total retrieval time for capturing the bright and dark images within two successive sampling cycles may further be decreased. Similarly, for simplification, FIG. 8 only shows the operation of the image sensors $S_{11}$ to $S_{32}$, and the operation of the active light sources $L_{11}$ to $L_{32}$ or 121 to 124 are similar to FIGS. 7B-7C.

As mentioned above, the conventional optical touch system may sacrifice the synchronization between image frames and the positioning accuracy in order to eliminate the interference from ambient light. Therefore, the present disclosure further provides an exposure mechanism of an optical touch system (FIGS. 4A-4C, 5, 7A-7C and 8) and an optical touch system (FIGS. 2 and 6A-6B) that may eliminate the interference form ambient light and increase the synchronization between image frames captured by different image sensors and the system operating frequency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical touch system, comprising:
  a touch surface;
  a plurality of reflection light bars disposed on edges of the touch surface, respectively;
  a first image sensor configured to capture image frames looking across the touch surface in a first sampling interval and a denoising sampling interval to respectively obtain a first bright image and a first dark image;
  a first active light source configured to irradiate corresponding to the first sampling interval;

a second image sensor configured to capture image frames looking across the touch surface in a second sampling interval and the denoising sampling interval to respectively obtain a second bright image and a second dark image, wherein the first sampling interval is longer than the second sampling interval;

a second active light source configured to irradiate corresponding to the second sampling interval; and a processing unit configured to
calculate a first differential image between the first bright image and the first dark image, and
calculate a second differential image between the second bright image and the second dark image.

2. The optical touch system as claimed in claim 1, wherein the denoising sampling interval is early than or later than the first sampling interval and the second sampling interval.

3. The optical touch system as claimed in claim 1, wherein the denoising sampling interval is equal to the second sampling interval.

4. The optical touch system as claimed in claim 3, wherein the processing unit is further configured to
calculate a time ratio of the first sampling interval and the denoising sampling interval, and
adjust a pixel gray level of the first dark image according to the time ratio.

5. The optical touch system as claimed in claim 1, wherein the first sampling interval and the second sampling interval form a first sampling cycle, and the denoising sampling interval is later than the first sampling cycle;
the first image sensor is further configured to capture a bright image in a first sampling interval of a second sampling cycle after the denoising sampling interval, and the first active light source irradiates corresponding to the first sampling interval of the second sampling cycle;
the second image sensor is further configured to capture a bright image in a second sampling interval of the second sampling cycle after the denoising sampling interval, and the second active light source irradiates corresponding to the second sampling interval of the second sampling cycle; and
the processing unit is further configured to
calculate a differential image between the bright image of the first sampling interval of the second sampling cycle and the first dark image, and
calculate a differential image between the bright image of the second sampling interval of the second sampling cycle and the second dark image.

6. The optical touch system as claimed in claim 1, further comprising:
a third image sensor configured to capture image frames looking across the touch surface in a third sampling interval and the denoising sampling interval to respectively obtain a third bright image and a third dark image; and
a third active light source configured to irradiate corresponding to the third sampling interval.

7. The optical touch system as claimed in claim 6, wherein the third active light source is disposed adjacent to the third image sensor.

8. The optical touch system as claimed in claim 1, wherein the first active light source is disposed adjacent to the first image sensor.

9. The optical touch system as claimed in claim 1, wherein the second active light source is disposed adjacent to the second image sensor.

10. The optical touch system as claimed in claim 1, wherein the processing unit is further configured to perform an object positioning according to the first and second differential images.

11. An optical touch system, comprising:
a touch surface;
a plurality of reflection light bars disposed on edges of the touch surface, respectively;
a first image sensor configured to capture image frames looking across the touch surface in a first sampling interval and a denoising sampling interval to respectively obtain a first bright image and a first dark image;
a first active light source configured to irradiate corresponding to the first sampling interval;
a second image sensor configured to capture image frames looking across the touch surface in a second sampling interval and the denoising sampling interval to respectively obtain a second bright image and a second dark image;
a second active light source configured to irradiate corresponding to the second sampling interval; and
a processing unit configured to
calculate a first differential image between the first bright image and the first dark image, and
calculate a second differential image between the second bright image and the second dark image,
wherein the first sampling interval and the second sampling interval form a first sampling cycle, and the denoising sampling interval is later than the first sampling cycle,
the first image sensor is further configured to capture a bright image in a first sampling interval of a second sampling cycle after the denoising sampling interval, and the first active light source irradiates corresponding to the first sampling interval of the second sampling cycle,
the second image sensor is further configured to capture a bright image in a second sampling interval of the second sampling cycle after the denoising sampling interval, and the second active light source irradiates corresponding to the second sampling interval of the second sampling cycle, and
the processing unit is further configured to calculate a differential image between the bright image of the first sampling interval of the second sampling cycle and the first dark image, and calculate a differential image between the bright image of the second sampling interval of the second sampling cycle and the second dark image.

12. The optical touch system as claimed in claim 11, wherein the first sampling interval, the second sampling interval and the denoising sampling interval are identical.

13. The optical touch system as claimed in claim 11, wherein the first active light source is disposed adjacent to the first image sensor.

14. The optical touch system as claimed in claim 11, wherein the second active light source is disposed adjacent to the second image sensor.

15. The optical touch system as claimed in claim 11, wherein the processing unit is further configured to perform an object positioning according to the first and second differential images.

* * * * *